United States Patent [19]

Ashman

[11] Patent Number: 4,969,499
[45] Date of Patent: Nov. 13, 1990

[54] TIRE MOUNTING APPARATUS

[75] Inventor: Robert B. Ashman, Antioch, Tenn.

[73] Assignee: Hennessey Industries, Inc., LaVergne, Tenn.

[21] Appl. No.: 400,445

[22] Filed: Aug. 30, 1989

[51] Int. Cl.$^5$ ............................................. B60C 25/08
[52] U.S. Cl. .................................... 157/1.22; 157/1.24
[58] Field of Search ................. 157/1, 1.17, 1.22, 1.24

[56] References Cited

U.S. PATENT DOCUMENTS

| | | | |
|---|---|---|---|
| 4,586,551 | 5/1986 | Collins | 157/1.24 |
| 4,610,288 | 9/1986 | Huinink et al. | 157/1.22 |
| 4,694,875 | 9/1987 | Goebel | 157/1.24 |
| 4,702,295 | 10/1987 | Ewald | 157/1.22 X |

*Primary Examiner*—James G. Smith
*Attorney, Agent, or Firm*—Neuman, Williams, Anderson & Olson

[57] ABSTRACT

An apparatus is provided for mounting on a wheel rim a deflated run-flat type tire which has been loosely preassembled on the wheel. The apparatus includes a wheel support for accommodating the preassembled tire and wheel and retaining same in a horizontal plane. A locking member coacts with the wheel support and locks the preassembled tire and wheel in the horizontal plane. An upright post is fixed a predetermined radial distance from the wheel support and is radially spaced from the periphery of the accommodated tire and wheel. A clamp device is mounted for vertical and transverse adjustment on the upright post and is adapted to clamp a segment of the beaded inner edge of the tire sidewall against a portion of a flange formed on the rim of the accommodated wheel. An installer unit is mounted at a selected elevated position relative to the accommodated tire and wheel and is adapted to be manually rotated intermittently about the axis of the accommodated wheel. The unit includes a radially extending arm having a roller piece pivotally connected ot a distal end of the arm. The roller piece is manually adjustable between operative and inoperative modes. When in the inoperative mode the roller piece rests upon a portion of the exposed surface of one sidewall of the preassembled tire, and, when in the operative mode, the roller piece pivots downwardly and inwardly toward the wheel axis causing the engaged sidewall portion to be distorted and the beaded inner edge thereof to fold over and engage the underside of a portion of the wheel rim flange.

10 Claims, 4 Drawing Sheets

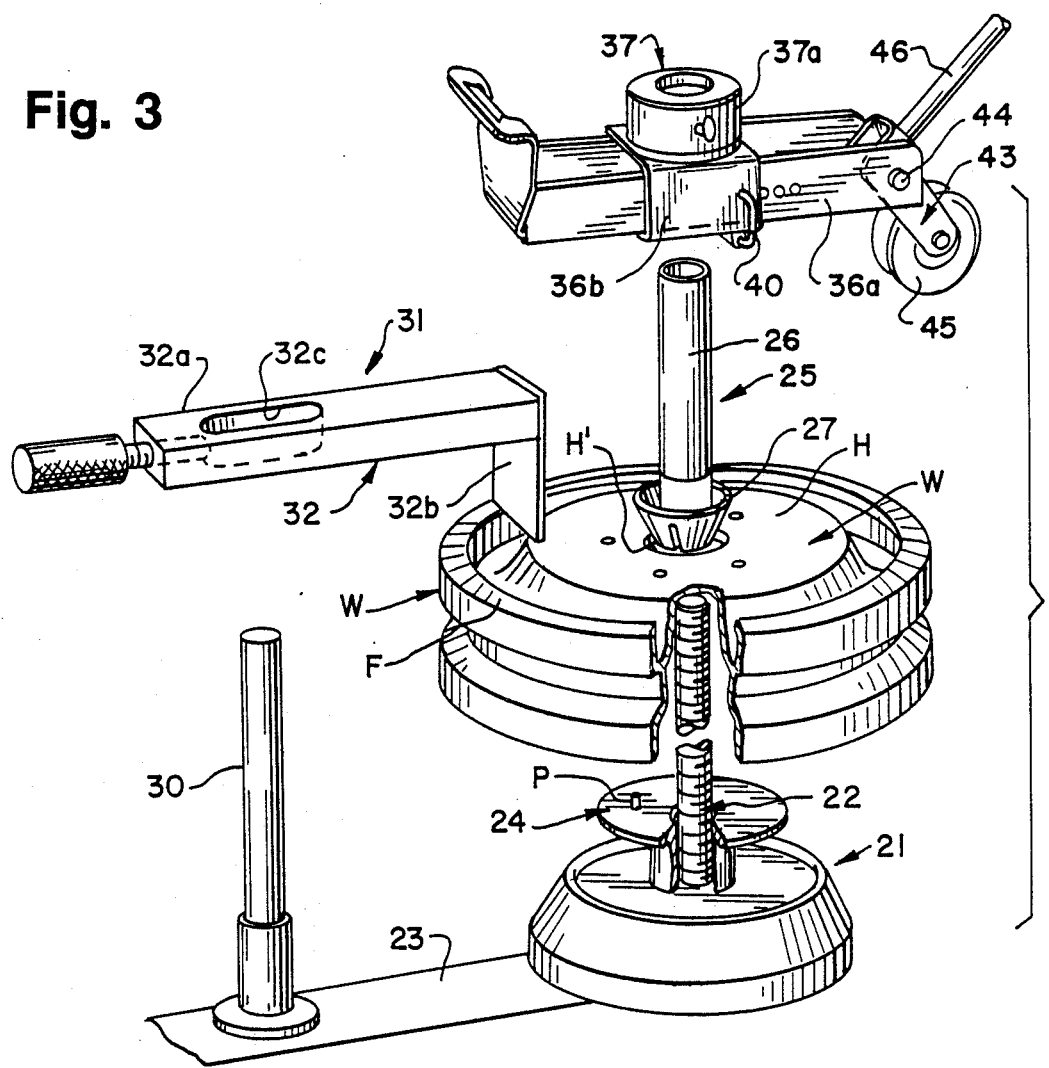
Fig. 3
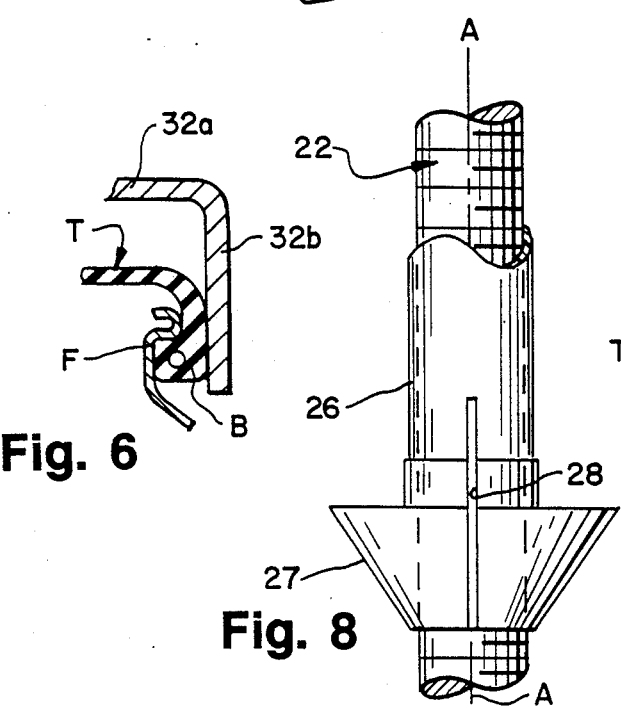
Fig. 6
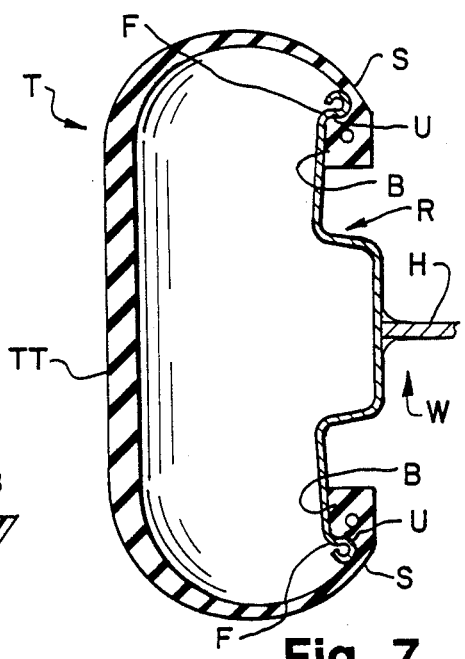
Fig. 8
Fig. 7

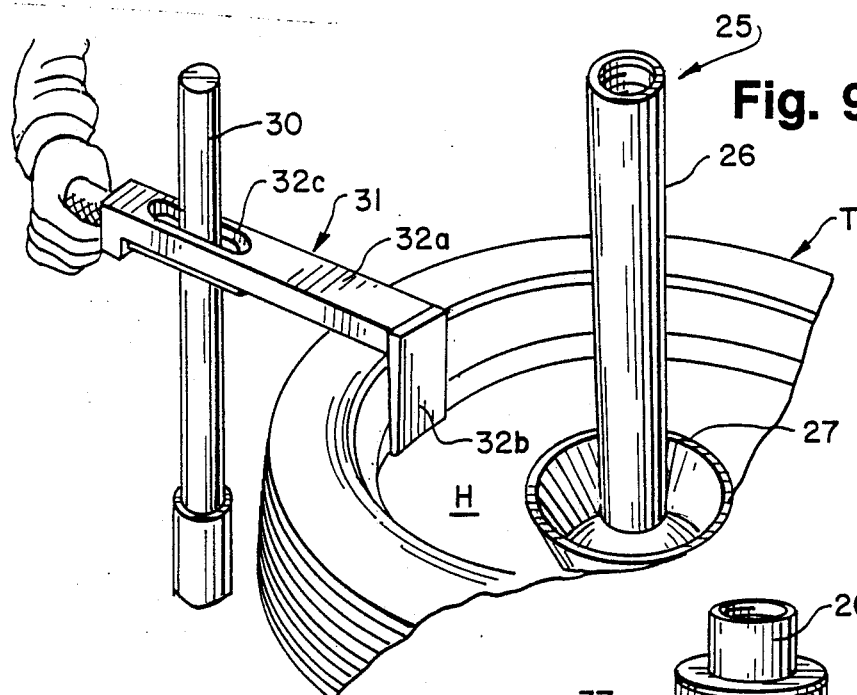
Fig. 9
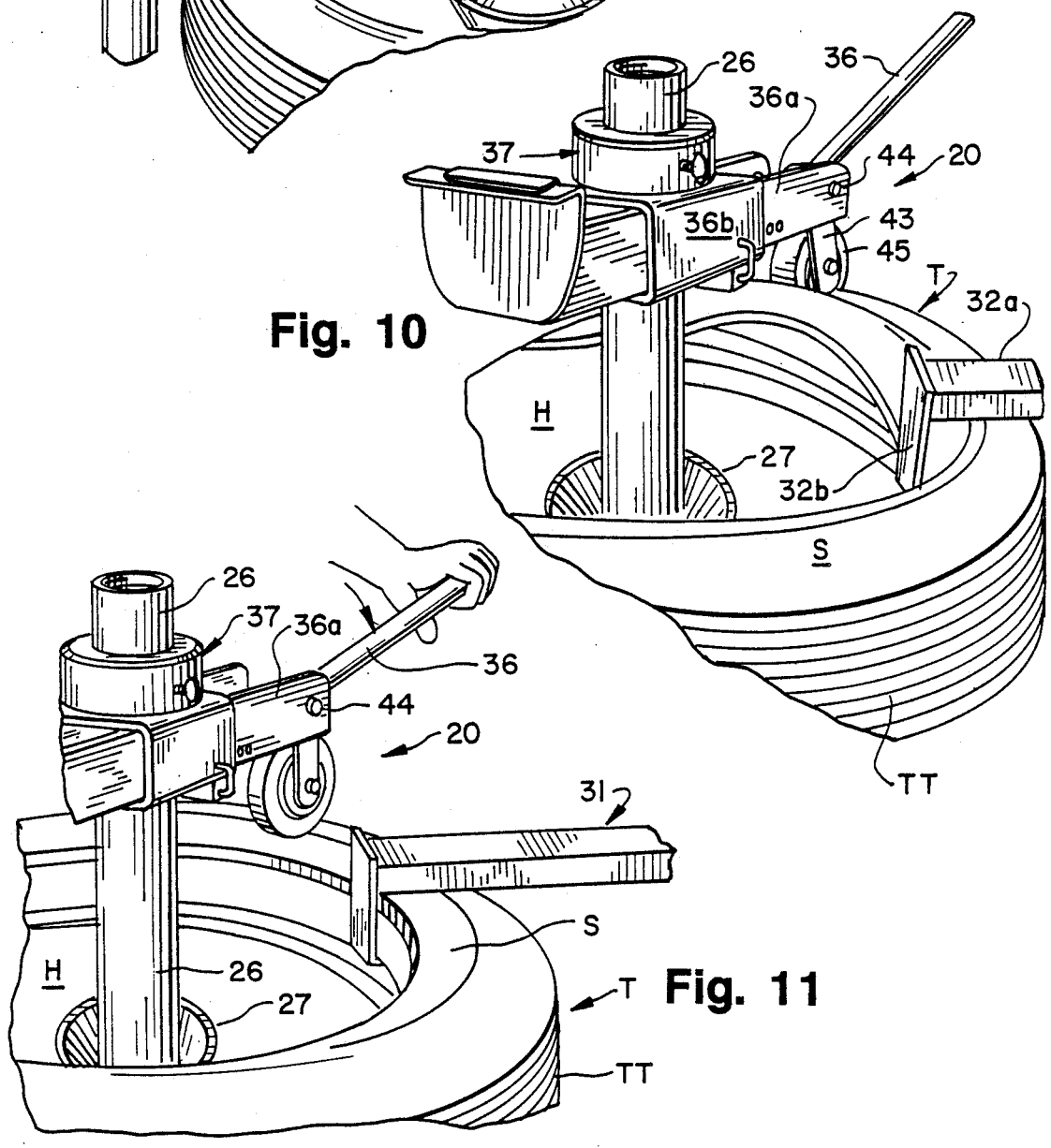
Fig. 10
Fig. 11

TIRE MOUNTING APPARATUS

BACKGROUND OF THE INVENTION

With the advent of the run-flat type pneumatic tire in the automobile and light truck markets, the mounting of such a tire on the rim of a wheel has heretofore been a frustrating, awkward, time consuming and fatiguing operation. A run-flat type tire as used herein relates to a tire wherein the inner edges of the sidewalls are each provided with a continuous bead which extends generally into the tire interior. When the tire is mounted on a wheel rim, the sidewalls and the tread section of tire cooperate so as to embrace the rim and the beaded inner edges of the sidewalls sealingly engage the underside of the flanges formed on the wheel rim when the tire is inflated. Because of the configuration of the run-flat type tire and the manner in which it sealingly engages the wheel rim, it heretofore required an inordinate amount of manual effort and dexterity to distort the sidewalls a sufficient amount to allow the beaded inner edges of the sidewalls to fold around the rim flanges and engage the underside of such flanges. Such a tire mounting operation, sometimes required the joint efforts of two persons, and/or frequently resulted in injury to the person, or persons, involved and/or damage to the tire itself.

SUMMARY OF THE INVENTION

Thus, an apparatus has been provided which greatly facilitates and expedites the tire mounting operation.

The apparatus eliminates, or significantly reduces, the safety hazards previously associated with the tire mounting operation.

The apparatus can readily accommodate wheel and tire sizes which vary over a wide range.

Further and additional advantages of the apparatus will become apparent from the description, accompanying drawings and appended claims.

In accordance with one embodiment of the invention an apparatus is provided for mounting on a wheel rim a deflated run-flat type tire wherein the tire has been loosely pre-assembled on the wheel. The apparatus includes a first means which is adapted to accommodate the wheel and support the pre-assembled tire and wheel in a substantially horizontal plane whereby one sidewall of the tire and one side of the wheel are exposed. A second means is provided which coacts with an upright first post included in the first means to lock the wheel in place. An upright second post is fixedly position a predetermined radial distance from the first post and is spaced from the periphery of the accommodated tire. Mounted at a selected elevated position on the second post is a clamping means which extends from the second post towards the first post. The clamping means is laterally adjustable relative to the second post whereby an offset portion thereof is adapted to engage and clamp a segment of the tire beaded inner edge against a portion of the rim flange of the wheel locked in place on the first means. An adjustable installer unit mounted at a selected elevated position relative to the exposed tire sidewall surface is adapted to be manually rotated intermittently about the first post as an axis. The installer unit includes an elongate rotatably mounted arm extending radially from the first post. Connected to an outer distal portion of the arm is a unit which is manually adjustable between operative and inoperative modes. When the unit is in the inoperative modes, a portion thereof rests upon a segment of the exposed surface of the tire sidewall. When the unit is in the operative mode, the portion thereof moves downwardly and inwardly towards the first post causing the engaged segment of the exposed sidewall adjacent the beaded inner edge thereof to be distorted downwardly and around the rim flange and engage an adjacent underside portion thereof. The unit is then manually returned to its inoperative mode and the arm is manually rotated a few degrees in one direction and the afore-described procedure is repeated until the entire beaded inner edge is in engagement with the rim flange. The tire and wheel assembly is then removed from the apparatus flipped over through an arc of 180° and then repositioned on the first means and the afore-described procedure repeated. After the beaded inner edges of both sidewalls have been brought into engagement with the corresponding rim flanges, a valve is positioned on the rim in the conventional way and the tire inflated.

DESCRIPTION

For a more complete understanding of the invention reference is made to the drawings wherein.

FIG. 3 is a fragmentary perspective view of the apparatus of FIG. 1 with the components thereof in exploded relation.

FIG. 6 is an enlarged fragmentary side elevational view, partially in vertical section, of the clamping means engaging a segment of the beaded inner edge of the sidewall of the supported tire and wheel assembly.

FIG. 7 is an enlarged fragmentary radial sectional view of a run-flat type of pneumatic tire sealingly mounted on the rim of a wheel.

FIG. 8 is an enlarged fragmentary side elevational view of the second means shown threadably mounted on the vertical post forming a component of the first means.

FIG. 9 is a fragmentary perspective view showing a segment of the beaded inner edge of the tire being clamped against an adjacent rim flange of the supported wheel.

FIGS. 10 and 11 are fragmentary perspective views showing respectively, the installer unit in an inoperative mode, and an operative mode.

Figure 1:
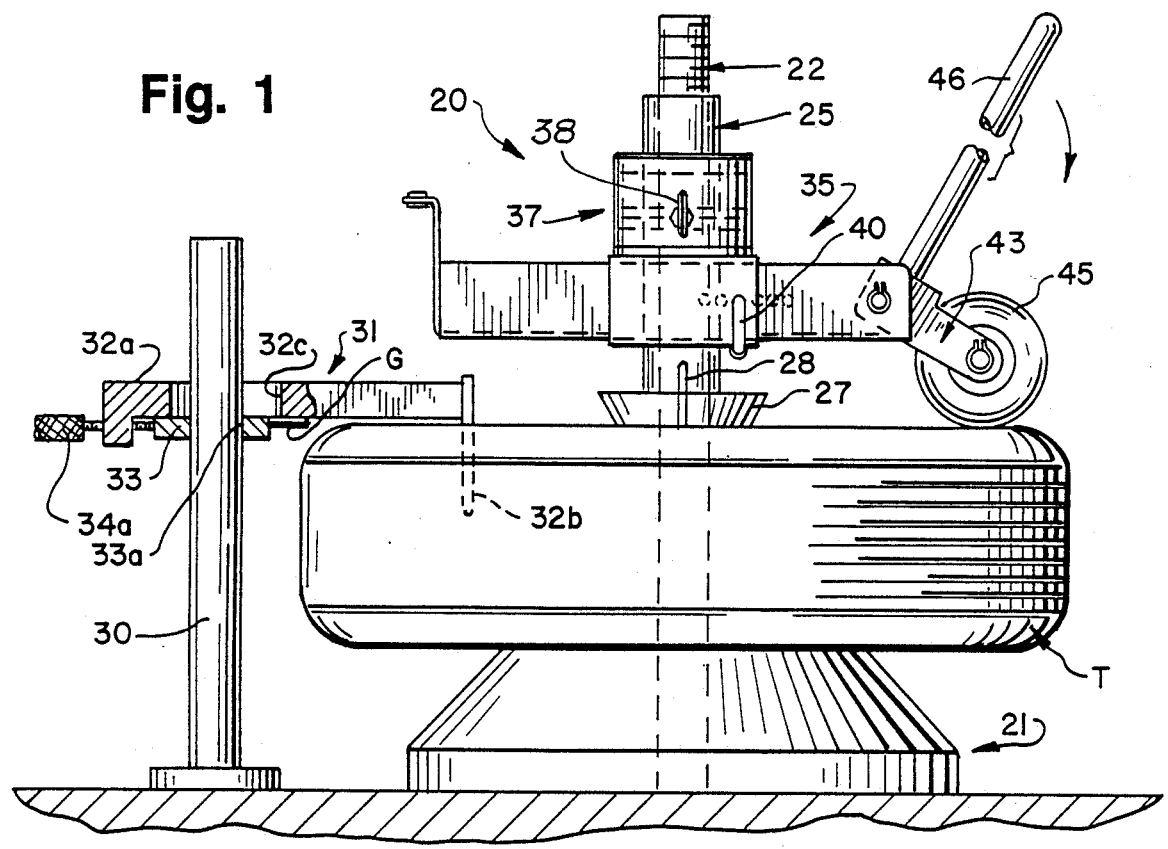
FIG. 1 is a fragmentary side elevational view of one embodiment of the apparatus showing a pre-assembled tire and wheel mounted in place on the first means and the installer unit in an inoperative mode.
Figure 2:
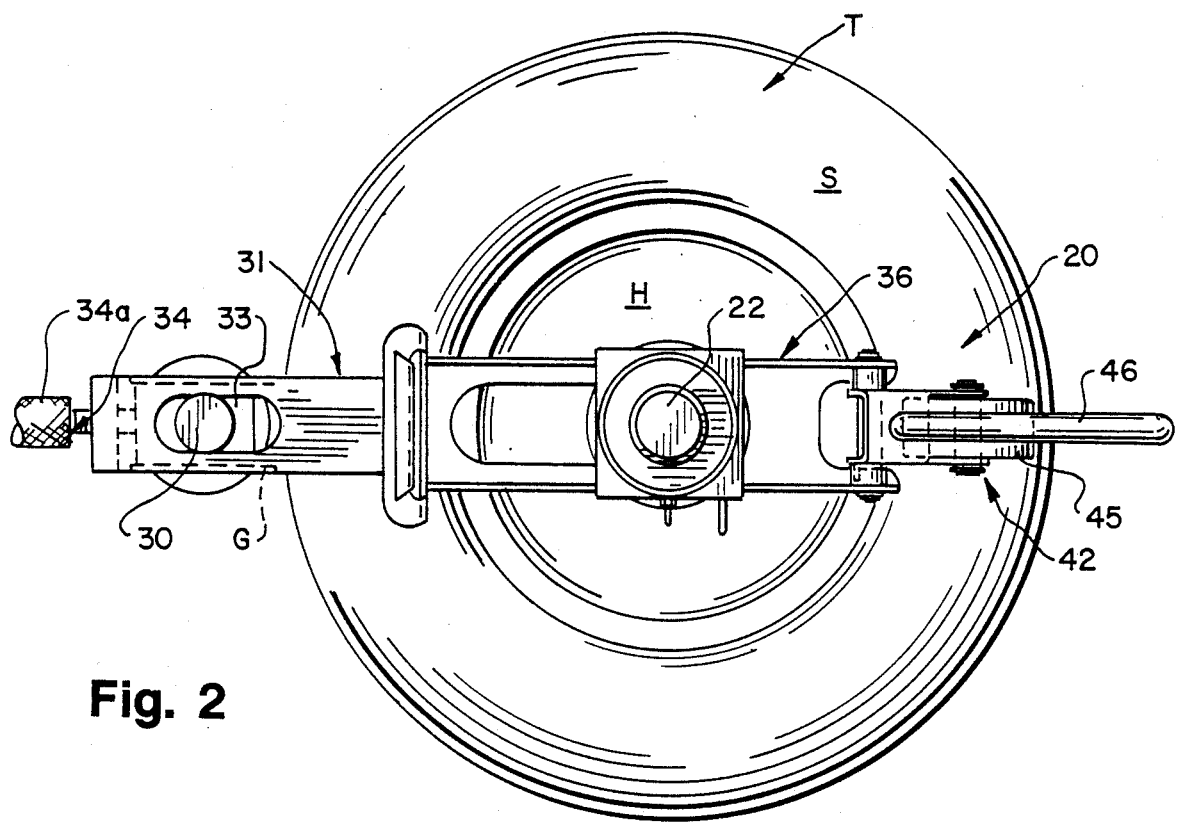
FIG. 2 is a fragmentary top view of the apparatus of FIG. 1.

Referring now to the drawings and more particularly to FIGS. 1–3, an apparatus 20 is shown which is particularly suitable for mounting a run-flat type pneumatic tire T on the rim R of a vehicle wheel W. The apparatus 20 is utilized after the tire has been loosely pre-assembled on the wheel.

A run-flat type of tire T, as seen more clearly in FIG. 7 includes a pair of sidewalls S having the outer edges thereof integrally connected to a tread section TT. The tread section contacts the road or highway surface, not shown, when the wheel on which the tire is mounted is connected to the axle of a vehicle. The inner edge of each sidewall is provided with an inwardly extending bead B. When the tire is mounted on the wheel rim R, the sidewalls embrace the flanges F formed on the rim. The flanges extend generally axially in opposite directions. The beads B formed on the sidewalls S are adapted to sealingly engage the undersides U of the rim flange when the tire is inflated. The run-flat designation for the tire T is derived from the fact that, if the tire should go flat while the vehicle is in motion, the wheel rim R will engage the interior surface of the tread section TT and thus, prevent cutting of the sidewalls. Cutting of the sidewalls of the conventional tire under a similar situation, frequently occurs when the inner edges of the sidewalls sealingly engage the interior surface of the wheel rim and thus the sidewalls is crushed between the rim flange and road surface.

Figure 4:
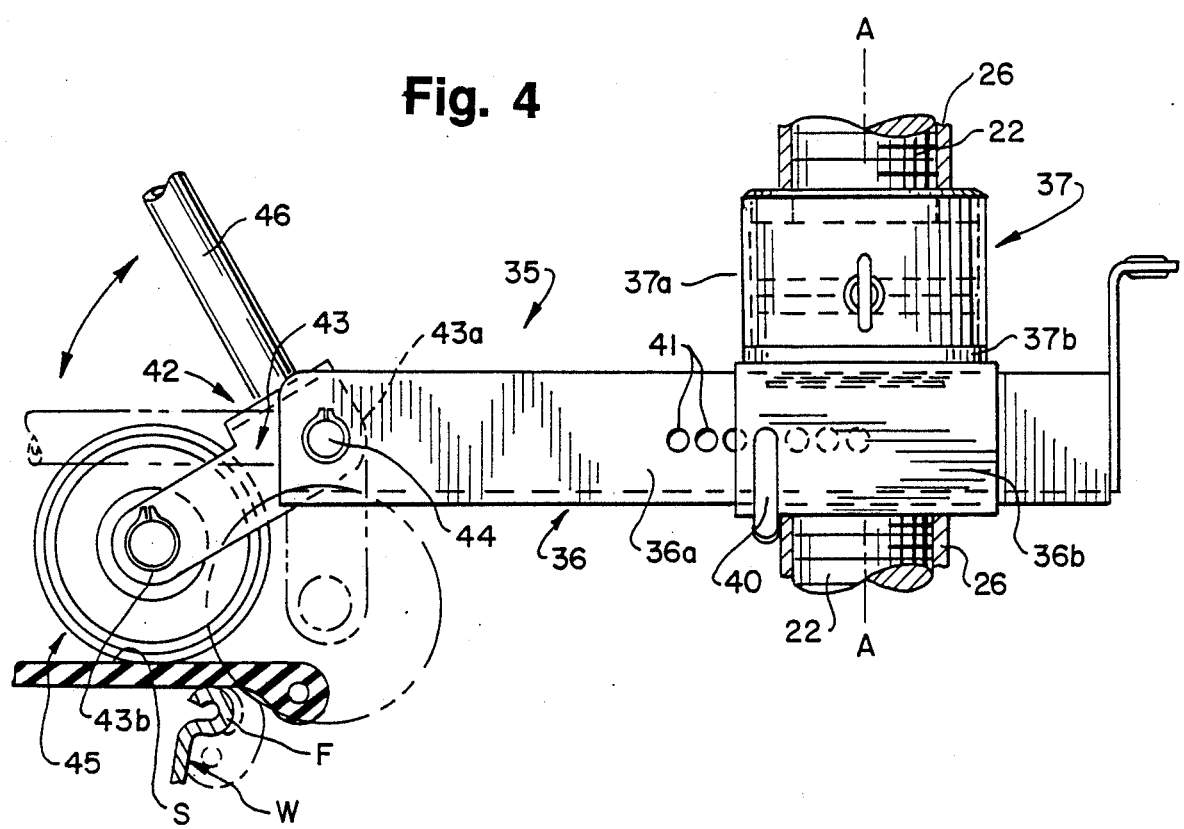
FIG. 4 is an enlarged fragmentary side elevational view, partially in vertical section, of the installer unit of FIG. 1, and showing same in an inoperative mode.

When the tire T is loosely pre-assembled on the wheel rim R, as seen in FIG. 4, the beaded inner edges of the sidewalls extend radially towards the wheel axis A—A, as seen in full lines in FIG. 4. The function of the apparatus 20 to be hereinafter described in detail, is to distort the inner edge of each sidewall so that it will bend around the adjacent rim flange and then the inner edge bead B will engage the underside of the rim flange and form a seal therewith when the tire is subsequently inflated.

The apparatus 20, as illustrated in FIGS. 1-3, includes a first means 21 which comprises an upstanding externally threaded post 22 having its one lock affixed to a suitable base 23. Assembled on the base is a spacer 24, through which post 22 extends. The upper surface of spacer 24 supportingly engages one side of the wheel hub H, when the pre-assembled tire and wheel are initially positioned on the apparatus. The spacer surface may be provided with an indexing pin P which is sized to be accommodated within a suitable opening formed in the wheel hub. Once the index pin is disposed within the hub opening, a locking member 25 is assembled on the post 22. Locking member 25 includes an internally threaded tubular section 26 and a funnel-shaped vice piece 27 affixed to the lower end of section 26. The downwardly tapered exterior surface of the vice piece 27 has the lower end portion thereof sized so that it will fit into the upper end of an axial bore H' formed in the wheel hub. As the tubular section 26 is threaded onto post 22, the funnelshaped vice piece will become wedged into the hub bore causing the wheel to be locked tightly against the spacer upper surface and the spacer 24, in turn, being held against the upper surface of the base 23.

As noted in FIG. 8, the vice piece 27 and the lower portion of tubular section 26 are split forming an elongate slot 28; thus, causing the split portion of the vice piece and lower portion of section 26 to squeeze together and grip the external threads of post 22 and lock the locking member 25 to the post 22, when the vice piece is wedged in the hub bore H' of the wheel W. The locking member 25 can be locked in place on the post 22 by a wrench or other suitable tool, not shown.

Once the pre-assembled tire and wheel are locked in place on the spacer, the wheel W is disposed in a substantially horizontal plane, see FIG. 1.

Apparatus 20 also includes an upright second post 30 which is parallel to the first post 22 and disposed at a predetermined radial distance therefrom so that the post 30 will be spaced outwardly from the outer periphery of the tread section TT of tire T. Post 30 is adapted to accommodate, a clamp assembly 31 which assumes a selected vertical position on the post. As seen in FIGS. 3 and 9, the clamp assembly 31 includes an L-shaped piece 32 having the longer leg 32a thereof substantially horizontally disposed and extending radially from post 30 towards post 22. The shorter leg 32b of piece 32 extends transversely downwardly and into an area defined by the exposed sidewall inner edge. Leg 32a is provided with an elongate slot 32c through which post 30 is adapted to extend. Mounted for longitudinal adjustment on leg 32a and aligned with slot 32c is a block 33 which is provided with a bore, 33a, through which the post 30 extends and is gripped thereby when the piece 32 is adjusted longitudinally by a turn-screw 34 relative to post 22 causing a segment of the exposed sidewall beaded inner edge to be tightly clamped against the wheel rim R. The turn-screw has one end terminating at an outwardly facing side of the block and the other end being exposed and forming a handle 34a. Disposed between the ends of the turn-screw is a depending bracket integral with longer leg 32a and having an internally threaded bore in meshing engagement with external threads formed on the turn-screw. The bracket is disposed at the outer end of slot 32c and the axis of the bore is aligned with the longitudinal axis of the slot. Suitable guides G are provided on the underside of leg 32a and maintain the block 33 in proper alignment with slot 32c. Thus, the short leg 32b when in a clamping mode prevents the tire from rotating relative to the wheel rim about the axis of the hub bore, see FIG. 9.

Figure 5:
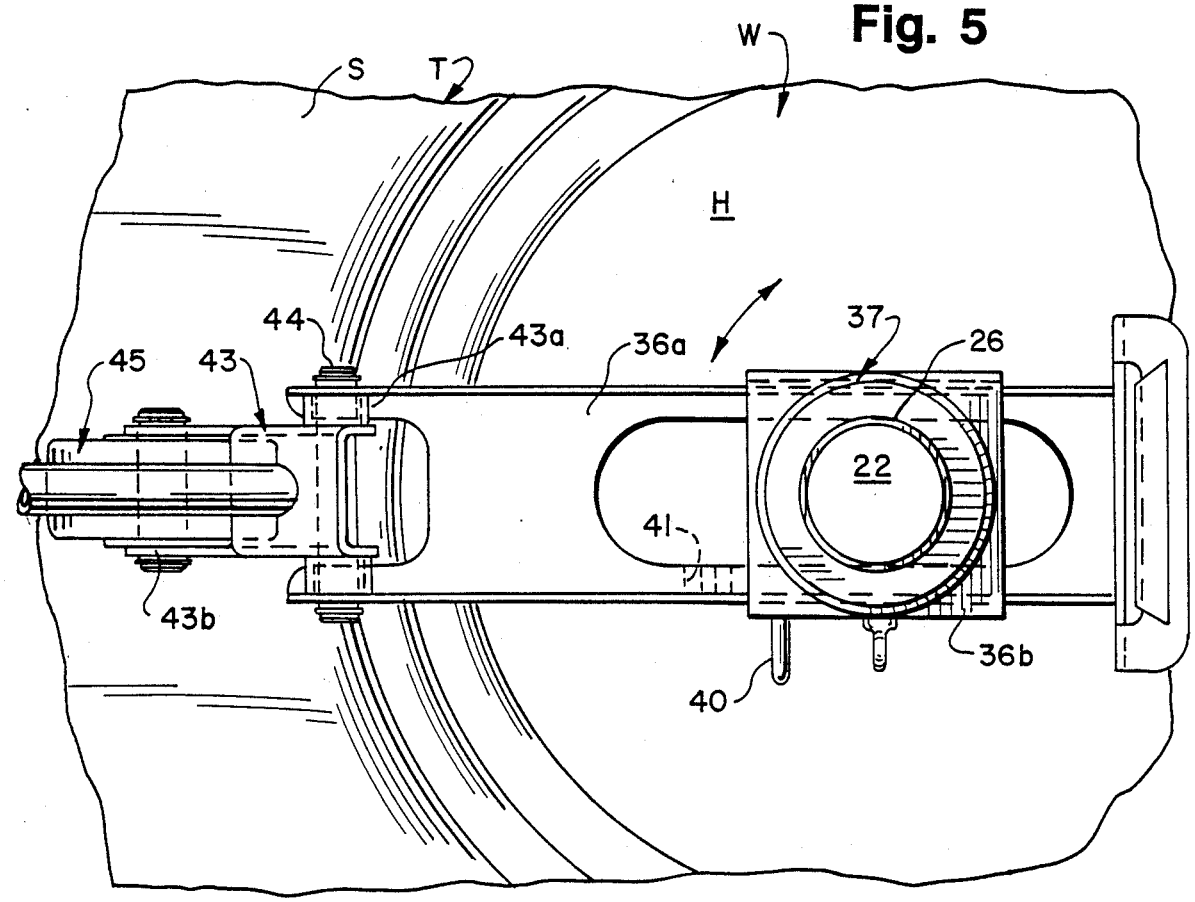
FIG. 5 is a top view of the installer unit of FIG. 4.

Mounted for vertical adjustment on post 22 is an installer unit 35, see FIGS. 4 and 5. The unit includes an elongate arm 36 which extends radially outwardly from post 22. The inner end portion of arm 36 is provided with a connector collar 37, the latter having an upper section 37a which encompasses the exterior of the tubular section 26 of locking member 25 and is retained thereon in a selected elevated position by a lock screw. Collar 37 is also provided with a lower section 37b about which the arm inner end portion is free to rotate. Axial movement of the inner end portion of the arm relative to the lower section 37b is restricted by a lock ring, not shown carried by and protruding from the lower section 37b and subtending the arm inner end portion. The arm 36 is formed into two longitudinally adjustable sections 36a and 36b. Section 36b is assembled on the connector collar section 37b and section 36a telescopes outwardly from section 36b, see FIG. 4. The section 36a is adapted to assume various selected telescoping positions by reason of a lock pin 40 carried on arm section 36b engaging a selected one of a plurality of longitudinally spaced holes 41 formed in arm section 36a.

Pivotally connected to the outer distal end of arm section 36a is a unit 42 which includes a link element 43 having one end 43a thereof pivotally connected by pin 44 to the distal end of arm section 36a. Rotatably connected to the opposite end 43b of element 43 is a roller 45. The axis of rotation is substantially parallel to the axis of pivot pin 44. Extending transversely outwardly and upwardly from the link element is an elongate handle 46. The handle facilitates manual adjustment of the link element 43 and roller 45 as a unit between inoperative and operative modes. When the link element and roller are in the inoperative mode, as shown in full lines in FIG. 4, the periphery of roller 45 rests upon a segment of the exposed surface of the sidewalls S of the tire T assembled on the supported wheel W. The roller while in such a mode should engage the sidewall surface in proximity to the beaded inner edge of the sidewall. By selecting the hole 41 in arm section 36a to be engaged by lock pin 40, the length of arm 36 can be adjusted so that proper positioning of the roller 45 on the exposed sidewall surface can be readily attained. Thus, the longitudinal adjustment of the arm enables the apparatus 20 to readily accommodate various size tires and wheels.

Upon the handle 46 being manually moved downwardly, the link element 43 will pivot in a counterclockwise direction, as seen in FIG. 4, about pivot pin 44 whereby the roller 55 will move downwardly and inwardly towards the axis AA into an operative mode, shown in phantom lines in FIG. 4. When roller 45 is moved to the operative mode, the sidewall will be distorted by the roller causing the inner edge of the sidewall engaged thereby to be bent downwardly and around the rim flange F until a portion of the bead B engages the underside of the flange, as shown in phantom lines in FIG. 4. Once the bead portion is in engagement with the flange underside, the handle 46 is manually pivoted in a clockwise direction until the roller returns to its inoperative mode. Once this occurs, the arm 36 and associated link element 43 and roller 45 are rotated a few degrees (e.g. 5%–10%) about axis A—A, and the manual adjustment of the roller 45 between the inoperative and operative modes is repeated until the entire inner edge of the sidewall, except that segment engaged by the clamp assembly 31, is in engagement with the rim flange F. Once the clamp assembly has been removed the remaining segment of the inner edge can be distorted around the rim flange by the roller.

Upon the rim flange F on one side of the wheel being completely engaged by the inner edge of the exposed sidewall, the tire and wheel are manually removed from the spacer 24 after the installer unit 35 and locking member 25 have been disassembled from the first post 22. The removed tire and wheel are then flipped over through an arc of 180° whereupon the wheel is once again secured to the upper surface of the spacer 24 by the locking member 25 thereby effecting exposure of the second sidewall of the tire and the opposite surface of the wheel. The same clamping and distorting procedures afore-described are then repeated.

Once the tire has been properly mounted on the wheel rim, a conventional air valve, not shown, is installed on the wheel in the usual manner whereupon the tire can then be inflated to the desired pressure. As the tire is inflated, the beaded inner edges of the sidewalls will sealingly engage the underside of the rim flanges.

Thus, an apparatus haS been provided which is of simple, yet sturdy, construction and greatly facilitates the mounting of a run-flat type of tire on a wheel. The apparatus is capable of accommodating various size tires and wheels in a safe and expedient manner.

I claim:

1. An apparatus for mounting on a wheel rim a deflated run-flat type tire which has been loosely pre-assembled on the wheel, the latter including a hub provided with an axial bore and a concentric rim having flanges extending axially in opposite directions, the tire being provided with a tread section and a pair of sidewalls extending therefrom generally in a direction towards the wheel hub, each sidewall having a beaded inner edge and an outer edge, the outer edges being interconnected by the tread section whereby the wheel rim is substantially encompassed by the tire; said apparatus comprising a fixedly mounted first means for supporting the loosely pre-assembled tire and wheel in a substantially horizontal plane whereby one tire sidewall and one side of the wheel rim are exposed; manually adjustable second means coacting with said first means for locking the pre-assembled tire and wheel on said first means; third means fixedly mounted a predetermined distance from the first means and beyond the periphery of the supported pre-assembled tire and wheel; fourth means mounted on the third means and adjustable relative thereto towards and away from said first means for clamping a segment of the beaded inner edge of the exposed sidewall against a rim section of the exposed wheel side; and a removable installer unit mounted for manual intermittent selective rotational adjustment about a vertical axis defined by the first means, said unit including a longitudinally adjustable arm mounted at a selected elevated position with respect to said first means and extending radially outwardly from said vertical axis, and fifth means pivotally connected to an outwardly extending distal portion of said arm, said fifth means being manually pivoted relative to said arm between operative and inoperative modes; when in an inoperative mode, said fifth means having a portion thereof adapted to rest upon an exterior surface of the exposed sidewall and adjacent the tire beaded inner edge, and when in the operative mode, said fifth means being manually pivoted downwardly and inwardly towards said vertical axis whereby the engaged sidewall exterior surface is distorted downwardly causing the beaded inner edge thereof to engage an underside of the rim flange on the exposed side of the supported wheel.

2. The apparatus of claim 1 wherein the vertical axis is defined by a fixedly mounted, vertically disposed post which is adapted to extend through the hub axial bore; and said second means includes a vice piece manually adjustable along said vertical axis and adapted to be tightened against the wheel and hold same in a fixed position on said first means.

3. The apparatus of claim 2 wherein the vice piece has a substantially funnel shape with a smaller end thereof being adapted to be wedged in an exposed end of the hub axial bore; said vice piece being provided with an elongate slot extending from the smaller end towards an opposite end of the vice piece; said slot being narrowed when said vice piece smaller end is in wedged relation with the hub axial bore.

4. The apparatus of claim 3 wherein in the vice piece is threadably mounted on the post; and yieldably grip the exterior of the post when said vice piece is wedged within the hub axial bore hub.

5. The apparatus of claim 4 wherein the vice piece includes an upwardly extending tubular section encompassing the post.

6. The apparatus of claim 1 wherein the fifth means portion includes a sidewall-engaging roller means having an axis thereof angularly disposed relative to the vertical axis.

7. The apparatus of claim 1 wherein the fifth means portion includes a roller means connected to one end of an elongate link element, said element having an opposite end thereof pivotally connected to the distal portion of said arm, and a handle affixed to said element and extending angularly therefrom for effecting manual pivotal adjustment of said fifth means between operative and inoperative modes.

8. The apparatus of claim 1 wherein the arm of the installer unit includes means for selectively adjusting the longitudinal dimension thereof.

9. The apparatus of claim 8 wherein the arm is provided with a connector collar having a first section adapted to interlock at a selected elevated position with a vertically disposed post forming a component of the first means and a second section axially disposed relative to said first section and being in rotatable engagement with a portion of said arm.

10. An apparatus for mounting on a wheel rim a deflated run-flat type tire which had been loosely pre-assembled on the wheel, the latter including a hub provided with an axial bore and a concentric rim having flanges extending axially in opposite directions, the tire being provided with a tread section and a pair of sidewalls, each of the latter having a beaded inner edge and an outer edge, the outer edges being interconnected by the tread section whereby the wheel rim is substantially encompassed by the tire; said apparatus comprising first means for supporting the loosely pre-assembled tire and wheel in a substantially horizontal plane whereby one tire sidewall and one side of the wheel rim are exposed; second means coating with said first means for locking the pre-assembled tire and wheel on said first means; third means fixedly mounted a predetermined radial distance from the first means and beyond the periphery of the supported pre-assembled tire and wheel; adjustable fourth mounted on the third means for clamping a segment of the beaded inner edge of the exposed sidewall against a rim section of the exposed wheel side; and a removable installer unit mounted for manual intermittent selective rotational adjustment about a vertical axis defined by the first means, said unit including an arm mounted at a selected elevated position with respect to said first means and extending radially outwardly from said vertical axis, and fifth means connected to an outwardly extending distal portion of said arm, said fifth means being manually adjustable relative to said arm between operative and inoperative modes; when in an inoperative mode, said fifth means being adapted to rest upon an exterior surface of the exposed sidewall and when in the operative mode, said fifth means moving downwardly and inwardly towards said vertical axis whereby the engaged sidewall exterior surface is adapted to be distorted downwardly causing the beaded inner edge thereof to engage an underside of the rim flange on the exposed side of the supported wheel; the first means including a vertically disposed first post for extending through the hub axial bore, and the third means including a vertically disposed second post, said first and second posts being in spaced substantially parallel relation.

* * * * *

UNITED STATES PATENT AND TRADEMARK OFFICE
CERTIFICATE OF CORRECTION

PATENT NO. : 4,969,499
DATED : November 13, 1990
INVENTOR(S) : Robert B. Ashman

It is certified that error appears in the above-identified patent and that said Letters Patent is hereby corrected as shown below:

On the Title page, right hand column, 10 lines from the bottom of the Abstract, change "ot" to --to--.

Column 5, line 51, "haS" should be --has--.

Column 6, line 51, "grip" should be --grips--.

line 53, delete "hub" (second occurrence)

Column 7, line 24, change "coating" to --coacting--.

Signed and Sealed this

Twenty-ninth Day of December, 1992

Attest:

DOUGLAS B. COMER

*Attesting Officer*    *Acting Commissioner of Patents and Trademarks*